(12) United States Patent
Hederer et al.

(10) Patent No.: US 7,837,974 B2
(45) Date of Patent: Nov. 23, 2010

(54) METHOD FOR HEATING AND PARTIAL OXIDATION OF A STEAM/NATURAL GAS MIXTURE AFTER A PRIMARY REFORMER

(75) Inventors: Hartmut Hederer, Dortmund (DE); Joachim Johanning, Oberhausen (DE); Evgeni Gorval, Dortmund (DE)

(73) Assignee: UHDE GmbH, Dortmund (DE)

( * ) Notice: Subject to any disclaimer, the term of this patent is extended or adjusted under 35 U.S.C. 154(b) by 429 days.

(21) Appl. No.: 11/920,192

(22) PCT Filed: Feb. 16, 2006

(86) PCT No.: PCT/EP2006/001380
§ 371 (c)(1),
(2), (4) Date: Dec. 4, 2007

(87) PCT Pub. No.: WO2006/119812
PCT Pub. Date: Nov. 16, 2006

(65) Prior Publication Data
US 2008/0290322 A1    Nov. 27, 2008

(30) Foreign Application Priority Data
May 10, 2005   (DE) ................ 10 2005 021 500

(51) Int. Cl.
*C01B 3/02*    (2006.01)
*C01B 3/24*    (2006.01)
(52) U.S. Cl. .............. 423/650; 423/220; 423/224; 423/235; 423/237; 423/246; 423/248; 423/580.1
(58) Field of Classification Search ................. 252/375
See application file for complete search history.

(56) References Cited

U.S. PATENT DOCUMENTS

| 5,522,723 A | 6/1996 | Durst et al. |
| 6,048,508 A * | 4/2000 | Dummersdorf et al. ..... 423/210 |
| 6,730,285 B2 | 5/2004 | Aasberg-Petersen et al. |
| 6,746,624 B1 | 6/2004 | Seier Christensen et al. |

(Continued)

FOREIGN PATENT DOCUMENTS

DE     19 200 01     12/1970

(Continued)

OTHER PUBLICATIONS

International Search Report.

*Primary Examiner*—Melvin C Mayes
*Assistant Examiner*—Kenneth Vaden
(74) *Attorney, Agent, or Firm*—Collard & Roe, P.C.

(57) ABSTRACT

By means of a method and a system for heating and partial oxidation of not separately pre-heated, pre-reformed steam/natural gas mixture for an $NH_3$ synthesis gas, whereby energy is supplied to the gas stream (raw synthesis gas), in the direction of flow, after a primary reformer, a solution is to be created, with which soot formation is to be prevented as much as possible, whereby the possibility of the addition of variable amounts, for example of $N_2$ and $O_2$ or mixtures thereof, is also supposed to be possible.

Figure 1:
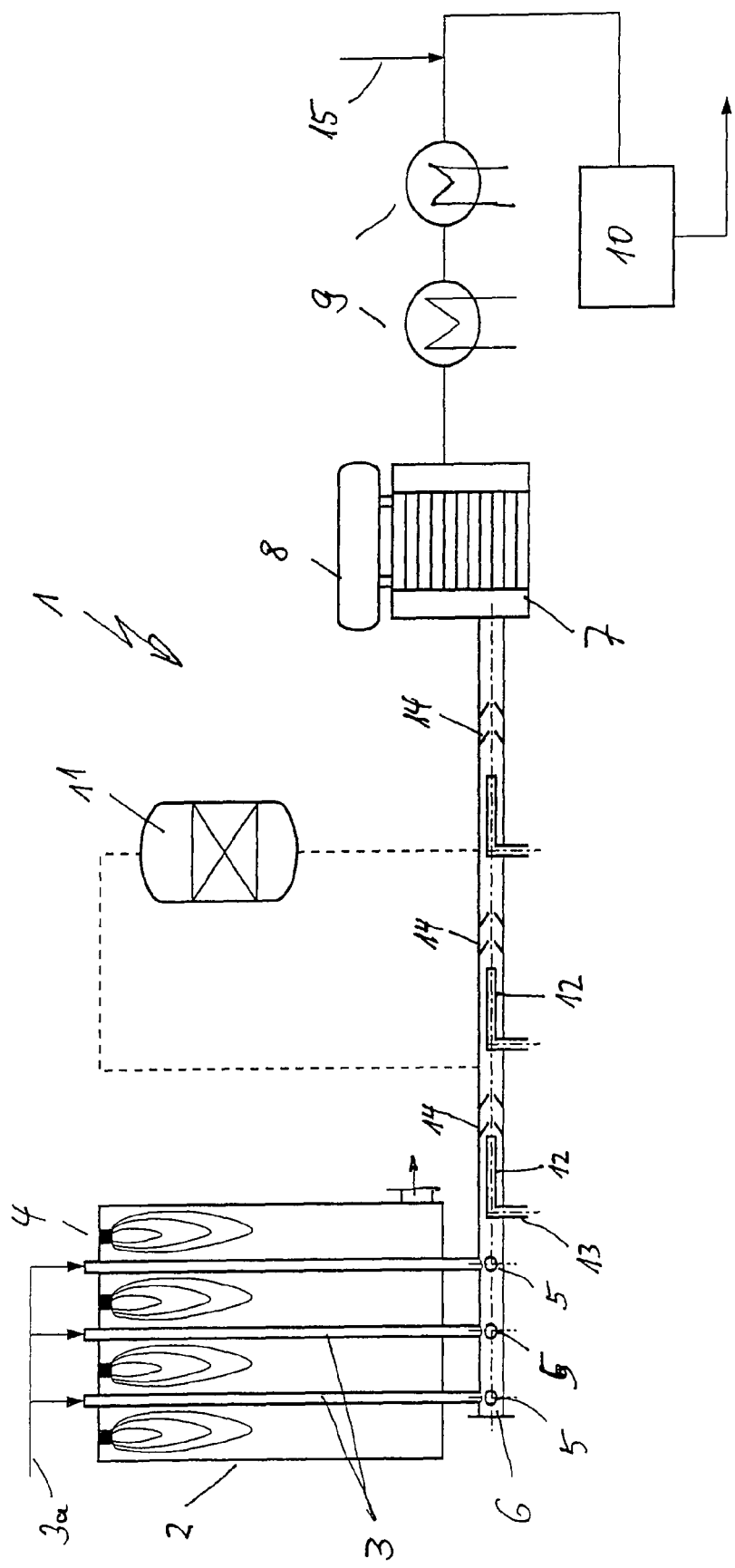

This is achieved, according to the method, in that the energy is supplied directly after the primary reformer, by way of at least one pore burner positioned in the gas discharge line of the primary reformer.

12 Claims, 6 Drawing Sheets

U.S. PATENT DOCUMENTS

| | | |
|---|---|---|
| 2002/0058005 A1 | 5/2002 | Aasberg-Petersen et al. |
| 2003/0219374 A1* | 11/2003 | Primdahl .................... 423/651 |

FOREIGN PATENT DOCUMENTS

| | | |
|---|---|---|
| DE | 4 322 109 | 1/1995 |
| DE | 19 839 782 A1 | 3/2000 |
| DE | 199 21 420 A1 | 11/2000 |
| DE | 102 32 970 A1 | 2/2003 |
| DE | 102 39 111 A1 | 3/2004 |
| EP | 0200 925 | 11/1986 |
| EP | 0 657 011 B | 6/1995 |
| EP | 0 876 993 A | 11/1998 |

* cited by examiner

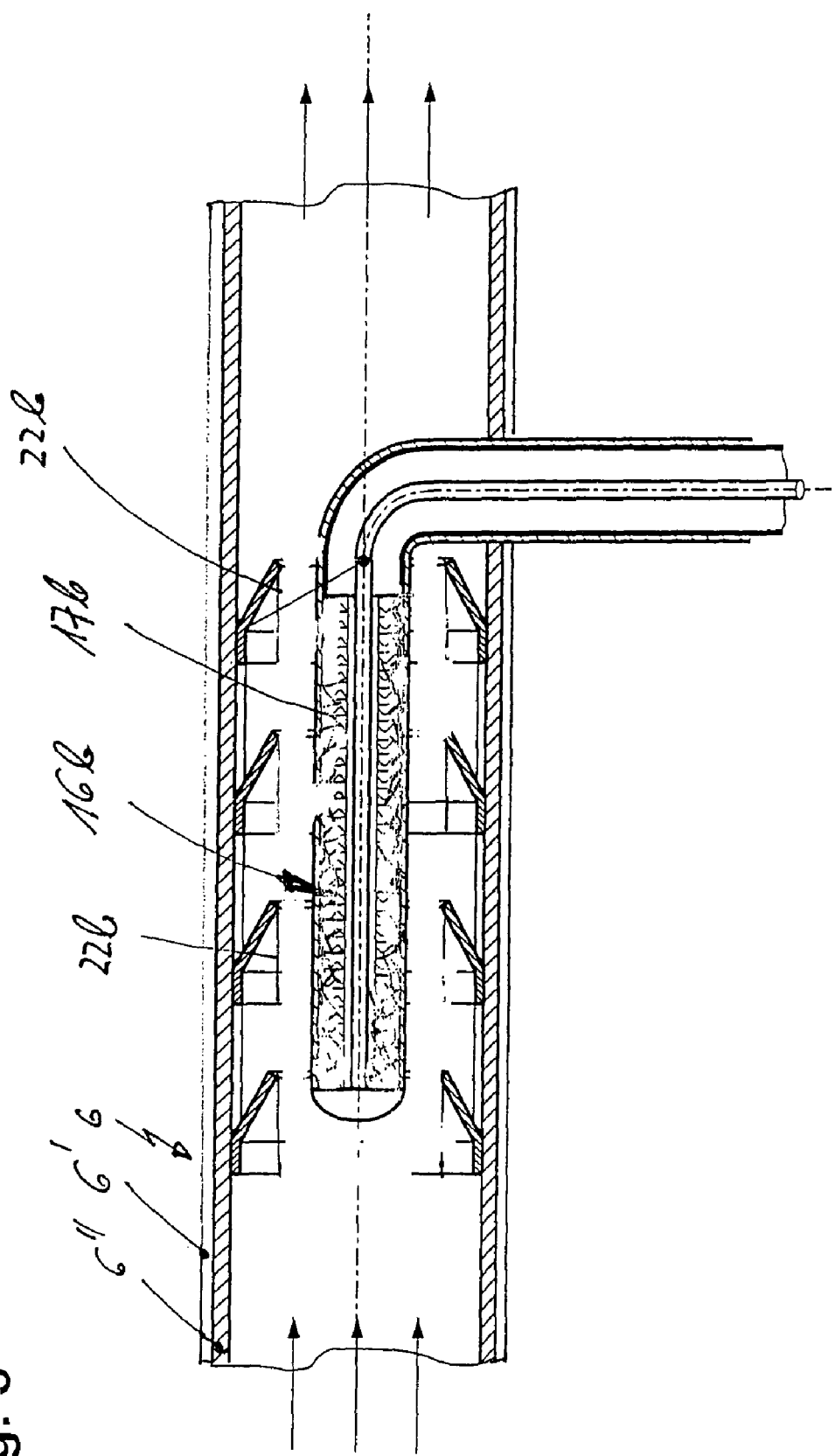

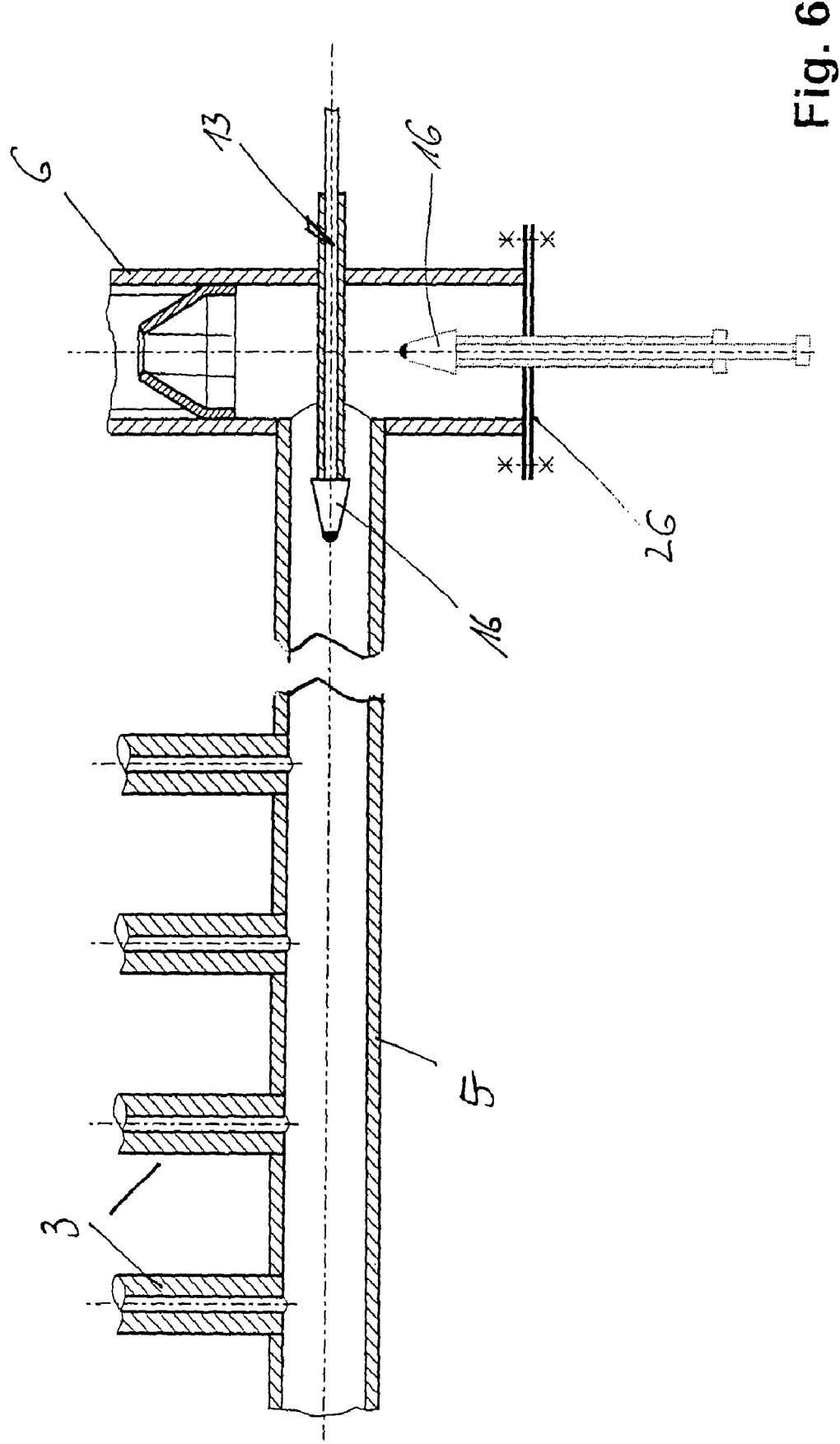

METHOD FOR HEATING AND PARTIAL OXIDATION OF A STEAM/NATURAL GAS MIXTURE AFTER A PRIMARY REFORMER

CROSS REFERENCE TO RELATED APPLICATIONS

Applicants claim priority under 35 U.S.C. §119 of German Application No. 10 2005 021 500.9 filed May 10, 2005. Applicants also claim priority under 35 U.S.C. §365 of PCT/EP2006/001380 filed Feb. 16, 2006. The international application under PCT article 21(2) was not published in English.

The invention relates to a method for heating and partial oxidation of a not separately pre-heated, pre-reformed steam/natural gas mixture for an $NH_3$ synthesis gas, whereby energy is supplied to the gas stream (raw synthesis gas), in the direction of flow, after a primary reformer.

Synthesis gas generation by means of steam reforming is usually accomplished with great heat integration, i.e. the waste heat of the steam reformer can be used in a large variety of heat exchangers for natural gas/air/steam heating or steam generation. In this connection, it is important, for the subsequent ammonium synthesis, to pre-heat the air required for the addition of atmospheric nitrogen as much as possible during synthesis gas generation.

Atmospheric nitrogen is supplied, together with the atmospheric oxygen, in a so-called secondary reformer, which is located downstream from the primary reformer. Partial oxidation of the gas coming from the primary reformer causes the gas composition to change, in part due to combustion but for the most part due to the resulting high equilibrium temperature, so the residual methane content in the synthesis gas will be significantly lower than 1 mole percent on a dry basis (generally above 1050-1150° C.). A subsequent catalyst charge accelerates the equilibrium formation.

Important factors for this process step are thorough mixing of the gas, presence of the steam-reforming active catalyst at continuously increasing temperatures, in order to avoid soot formation from the residual methane content (typically 10-14 mole percent) due to $CH_4$ decomposition, also in connection with the presence of CO and $CO_2$, and the presence of water vapor.

This is where the invention takes its start, the goal of which is, among other things, to prevent soot formation as much as possible, whereby the possibility of a variable addition, for example of $N_2$ and $O_2$ or a mixture thereof, is also supposed to be possible.

Using a process as described above, this task is accomplished, according to the invention, in that the energy is supplied after the primary reformer, by way of at least one pore burner that is positioned in the gas discharge line of the primary reformer.

Using pore burners after the primary reformer within the flow path of the gas to be treated provides a multitude of advantages; in particular, a separate reactor, such as the secondary reformer, for example, can be completely eliminated.

Other advantages are, for example:
wide control range,
stability of the burner flame independent of the raw synthesis gas approach velocity (due to the possibility of own fuel gas feed),
burner start-up, even if only $N_2$/steam are present in the circuit,
possibility of variable addition of nitrogen and oxygen and mixtures thereof,
possibility of short-term reactions and therefore reduced risk of soot formation,
catalyst on the static mixers: ensures gas equilibrium, reduces soot formation risk at high temperature increases,
exchangeability of the static mixers in an insulated, modular walled pipe (metal-dusting resistant material, may be aluminum-coated)
additional variable catalyst insert: e.g. a partial oxidation catalyst directly on the burner and downstream, a steam-reform catalyst,
the required amount of oxygen may be less, because the consumption (combustion) of raw synthesis gas ($H_2$, CO, and $CH_4$) already generated is reduced, because combustion gas (e.g. $CH_4$) is or can be added separately,
the remaining residual methane will be further steam-reformed.

At this point, we refer to existing literature, which addresses the problems of the present invention, at least marginally. For example, DE-OS 19 200 01, EP-0 200 925-A1, EP-876 993-A1, or U.S. Pat. No. 6,730,285-A all address the production of a synthesis gas. U.S. Pat. No. 6,746,624-A, which comes from the same applicant, shows coated catalyst tubes, whereby DE-198 39 782-A1 shows static mixers in flow paths, among other things. DE-102 32 970-A1 describes short-term special oxidation without prior steam reforming. DE-102 39 111-A1 mentions the use of a pore burner in connection with a fuel cell.

Further embodiments of the invention are evident from the dependent claims, whereby it is possible to directly supply the energy through several pore burners positioned in the gas discharge lines of the primary reformer that form the flow path.

As an example, it is also provided that in addition to the energy feed by means of fuel gas and oxygen as an oxidation medium, nitrogen and/or small amounts of $CO_2$ and/or steam may be supplied.

By means of a pore burner according to the invention, it is possible to regulate the amount of fuel gas over a wide range, preferably hyperstoichiometrically.

The use of a pore burner also allows the provision of catalyst-coated, static mixers within the gas stream, in such a manner that the gas streams are suitably vortexed by these mixers, also provided by the invention. In this connection, it is useful to vortex the gas stream by way of static mixers after the respective burner, whereby according to the invention, the first mixers will have a partial oxidation catalyst coating, and the remaining mixers will have a steam-reforming catalyst coating.

The invention also provides that the pore burner itself will be fed with an unheated or slightly pre-heated, fuel gas/air mixture (in particular, $CH_4$+air) for stoichiometric or hyper-stoichiometric operation. The fuel gas mixture temperature must remain below the ignition limit.

It is advantageous if the gas mixture is heated to a temperature of 1000° C. to 1100° C. by the pore burner(s), in order to reliably prevent any soot content in the synthesis gas.

Heating can be accomplished by means of several series-connected pore burners, whereby catalytic mixing stages are provided in between, according to the invention.

In another embodiment of the invention, the gas stream after or in between the static mixing elements will be guided by way of additional, particularly honeycomb-type, catalyst-containing elements.

The invention solves the problem specified at the beginning, in particular, by means of a system that is characterized in that it provides at least one pore burner in each reformer tube manifold between the last tube entry point and the connection to the transfer lines downstream from the primary reformer.

In this connection, it can be provided, in an embodiment, that a static mixer is assigned to each pore burner, in particular downstream from it.

Figure 2:
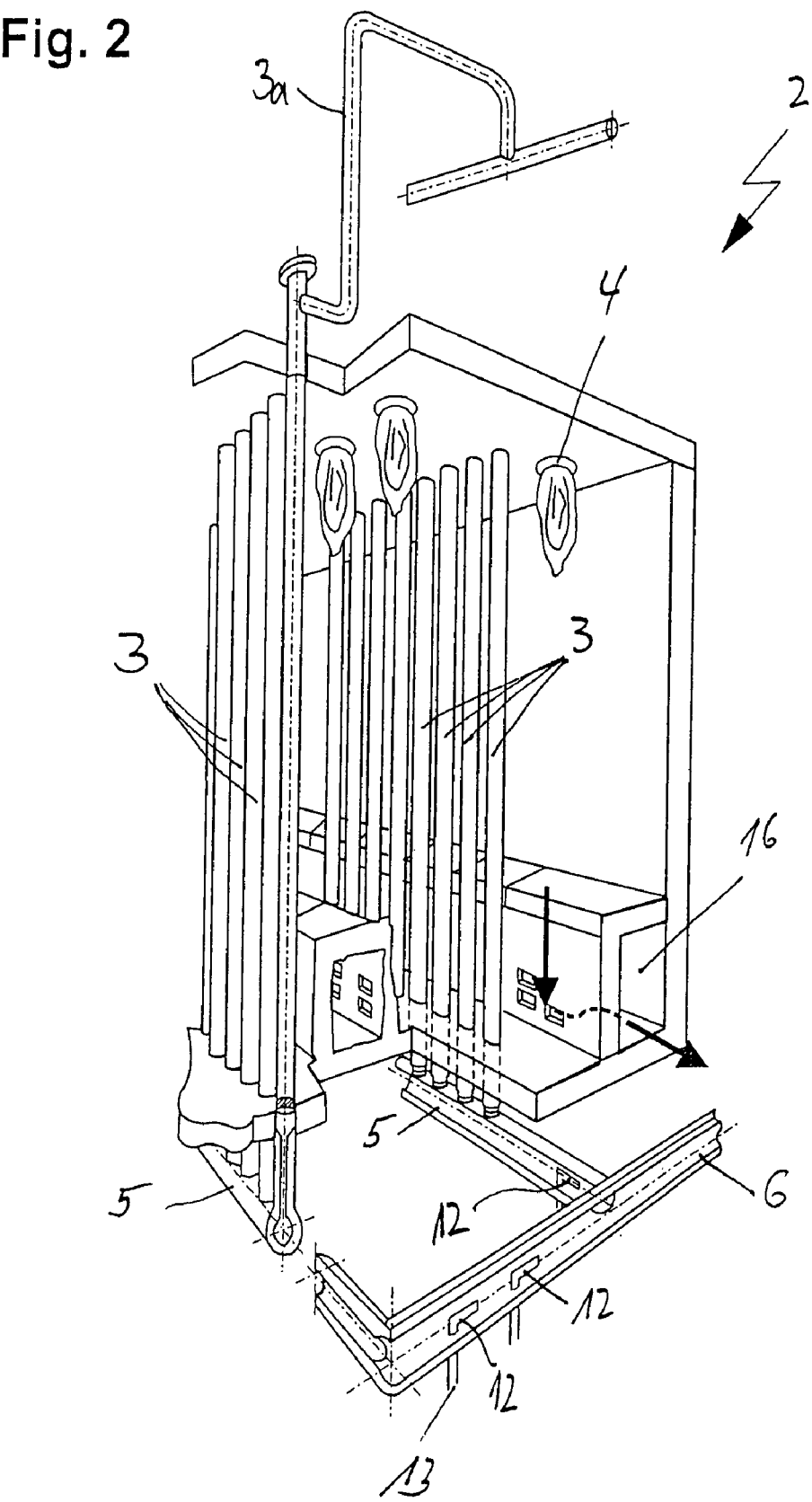
Figure 3:
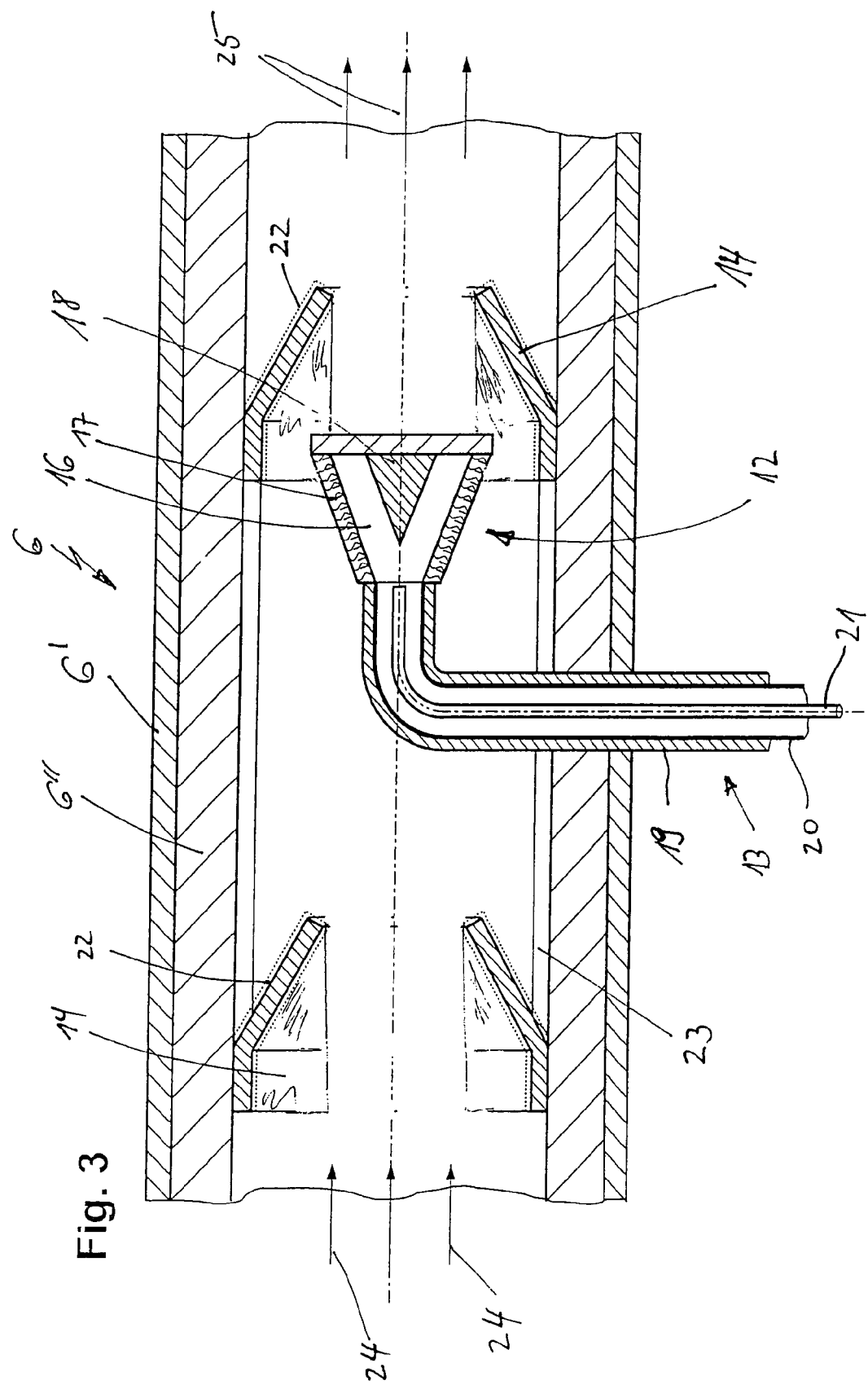
Figure 4:
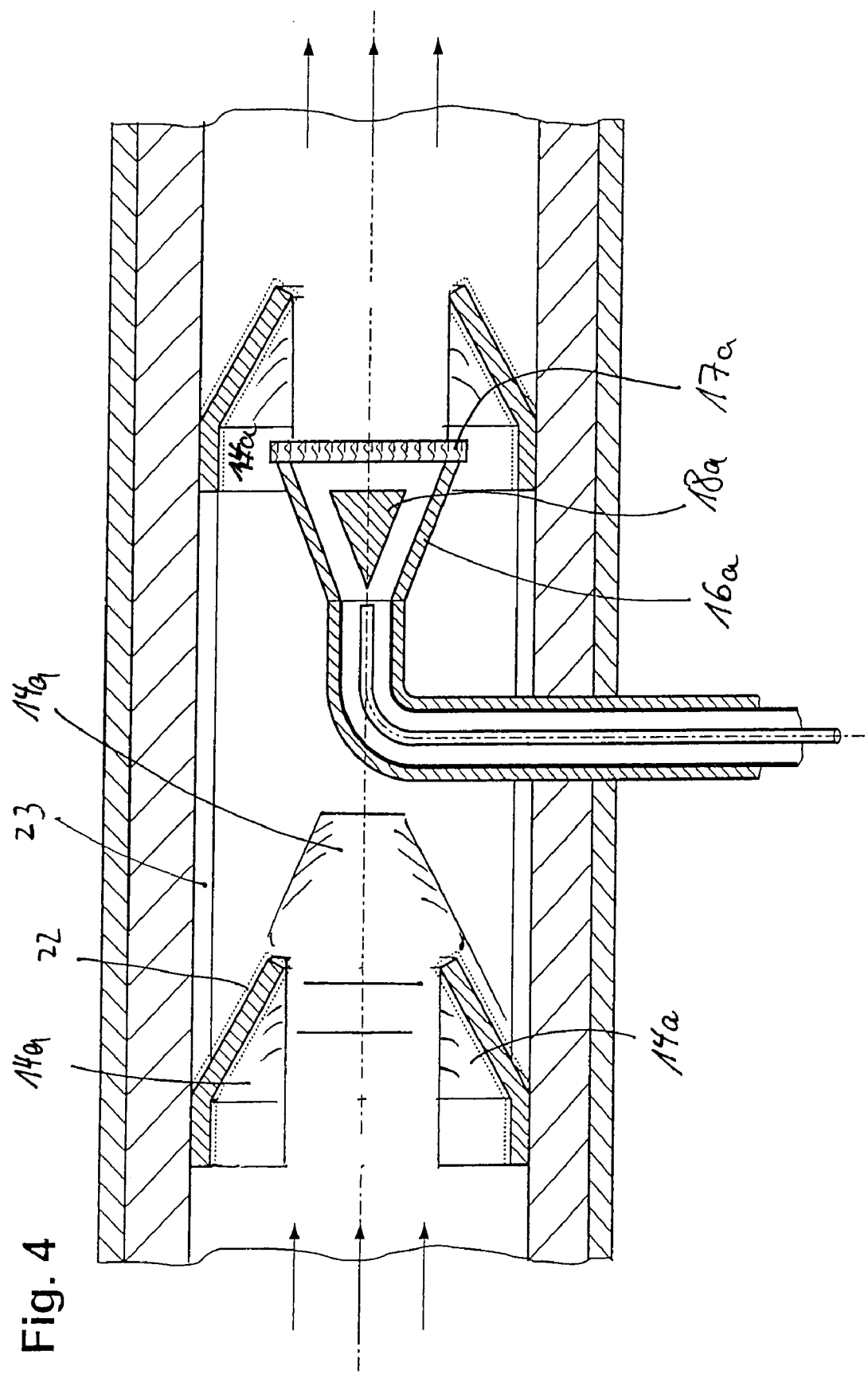

Additional characteristics, details, and advantages of the invention are evident from the following description and shown in the drawing. This shows:

FIG. 1 a basic schematic of a primary reformer with downstream units and the pore burners according to the invention;

FIG. 2 a simplified spatial representation of a primary reformer with manifolds and pore burners positioned according to the invention;

FIG. 3 to 5 enlarged representations of tube sections with differently designed pore burners; and FIG. 6 the positioning of pore burners in the transition region of a manifold to a transfer line.

The essential system parts of the subsystem referred to in general with 1 in FIG. 1 comprise the primary reformer, designated as 2, and the reformer tubes 3 ($CH_4$+steam feed line), and ceiling burners 4, manifolds 5, and at least one transfer line 6, whereby the latter leads into a waste heat boiler 7 with steam drum 8, and finally, by way of heat exchanger 9, to a CO/Shift 10, which however, is not important here.

The broken line shows the option of an external (adiabatic) catalyst bed 11. In FIG. 1, the pore burners positioned in the transfer line 6 are designated in general as 12, their feed elements as 13, by means of which air and $CH_4$, for example, are separately fed in and mixed at the last moment, whereby, as indicated in FIG. 1, catalytic, static mixers 14 are provided in the flow direction after each pore burner 12. Finally, FIG. 1 also shows a feed line 15, which could be used to supply the system with steam.

FIG. 2 shows a simplified three-dimensional representation of the primary reformer 2 with the reformer tubes 3 fed by way of the $CH_4$ steam supply line 3a, the ceiling burners 4, and exhaust gas manifolds 16 for removal of the waste gas from the combustion chamber, and the manifolds 5, and a transfer line 6 in which pore burners 12 are provided.

FIGS. 3 to 5 show only sections of the tube identified with 6', for example, of a transfer line 6, into which line pore burners designated in general as 12 are built. In the example shown in FIG. 3, the pore burner head, designated as 16, is configured in cone shape, with the porous burner wall 17, and a displacement body 18 directed counter to the direction of flow, with a cover plate directed downstream.

The feed line 13, which carries the burner head 16, has an outer insulation 19, a cold air supply line with, for example, $O_2$-containing gas 20, and a central inner tube 21 for the ignition gas or fuel gas.

The pore burners have in common that combustion occurs in the burner wall 17, i.e., no backfiring is possible. Details of such burners are described, for example, in DE-43 22 109-A or the corresponding EP-0 657 011-B.

FIG. 3 also shows how the static mixers 14 provided with a catalyst coating 22 are positioned in the tube 6. Their illustration as baffle plates or guide plates is merely symbolic; they can also have a blade shape or the like, that is not important here. For example, the static mixers can be connected, by way of retaining rods 23, to form a unit, in such a manner that this unit can be pulled out of the tube 6 with its insulation coating 6", but this is not shown in the illustration. The same applies to the removability of the burner.

The flow direction of the raw synthesis gas is indicated by small arrows 24 in the figures. The hot synthesis gas downstream from the burners is identified by the arrows 25. This synthesis gas contains $N_2$, CO, $CO_2$, $H_2$, $H_2O$.

A modified embodiment of a burner head 16a is shown in FIG. 4, in a manner similar to FIG. 3. Here, the porous burner wall 17a is positioned slightly differently; it forms the cover plate of the burner, as does the inner displacement body 18. Otherwise, the relations conform to the ones in FIG. 3.

In FIG. 4, the catalyst-coated static mixers have a slightly different shape, as partial shovel blades 22a, and are also combined into an installation cage, by way of corresponding connecting elements 23.

FIG. 5 again shows a modified exemplary embodiment, in particular in regard to the configuration of the pore burner 16b. The latter is configured as a cylindrical burner body here, whereby a row of static mixers 22b is allocated across the length of the wall 10b that contains the flame front.

Finally, FIG. 6 shows a pore burner with feed line, the burner head 16 of which, in the example shown, protrudes into a manifold 5 that carries the reformer tubes, whereby a transfer line 6 is provided at its head end, which for illustration purposes is rotated 90° in the plane of the drawing. The positioning of a pore burner head 16 in this transfer line 6 is shown with a thinner line in FIG. 6, whereby an end cover provides for easy installation and removal. The end cover is identified with 26.

Of course, the exemplary embodiments of the invention that are described can be modified in many ways without deviating from the basic idea of the invention. This holds true, in particular, to all configurations of the pore burner and its particular positioning within the flow path of the gas to be heated.

The invention claimed is:

1. A method for heating and partial oxidation of a pre-reformed steam/natural gas mixture for an $NH_3$ synthesis gas, comprising supplying energy to a gas stream of raw synthesis gas, in the direction of flow, after a primary reformer, wherein the energy is supplied directly after the primary reformer, by way of several pore burners positioned in gas discharge lines of the primary reformer, the gas discharge lines forming the flow path.

2. The method according to claim 1, wherein in addition to an energy feed by means of fuel gas and oxidation medium, nitrogen is also fed into the gas stream, in order to adapt the synthesis gas for an ammonia system.

3. The method according to claim 1, wherein additionally $CO_2$ and/or steam are fed into the gas stream.

4. The method according to claim 1, wherein the pore burners, in relation to the pre-reformed steam/natural gas mixture are operated hypostoichiometrically or, in the case of supplied fuel gas, hyperstoichiometrically.

5. The method according to claim 1, wherein the several pore burners are fed with a fuel gas/air mixture for stoichiometric or hyperstoichiometric operation.

6. The method according to claim 1, wherein the gas mixture is heated to a temperature of about 1000-1100° C. by way of the several pore burners.

7. The method according to claim 1, wherein the pore burners are operated as an oxygen/steam burner.

8. A method for heating and partial oxidation of a pre-reformed steam/natural gas mixture for an $NH_3$ synthesis gas, comprising supplying energy to a gas stream of raw synthesis gas, in the direction of flow, after a primary reformer, wherein the energy is supplied directly after the primary reformer, by way of at least one pore burner positioned in a gas discharge line;

wherein the gas stream is vortexed by way of static mixers coated with steam reformer catalyst.

9. A method for heating and partial oxidation of a pre-reformed steam/natural gas mixture for an $NH_3$ synthesis gas, comprising supplying energy to a gas stream of raw synthesis gas, in the direction of flow, after a primary reformer, wherein the energy is supplied directly after the primary reformer, by way of at least one pore burner positioned in a gas discharge line;

wherein the gas stream is vortexed by way of static mixers after the at least one pore burner, whereby the static mixers are provided with a partial oxidation catalyst coating.

10. A method for heating and partial oxidation of a pre-reformed steam/natural gas mixture for an $NH_3$ synthesis gas, comprising supplying energy to a gas stream of raw synthesis gas, in the direction of flow, after a primary reformer, wherein the energy is supplied directly after the primary reformer, by way of at least one pore burner positioned in a gas discharge line;

wherein heating is accomplished by means of several series-connected pore burners with intermediate catalytic mixing stages.

11. A method for heating and partial oxidation of a pre-reformed steam/natural gas mixture for an $NH_3$ synthesis gas, comprising supplying energy to a gas stream of raw synthesis gas, in the direction of flow, after a primary reformer, wherein the energy is supplied directly after the primary reformer, by way of at least one pore burner positioned in a gas discharge line;

wherein the gas stream is guided by way of additional honeycomb-type elements coated with steam-reformer catalyst; and wherein the additional honeycomb-type elements are provided after or between static mixing elements.

12. A method for heating and partial oxidation of a pre-reformed steam/natural gas mixture for an $NH_3$ synthesis gas, comprising supplying energy to a gas stream of raw synthesis gas, in the direction of flow, after a primary reformer, wherein the energy is supplied directly after the primary reformer, by way of at least one pore burner positioned in a gas discharge line;

wherein the at least one pore burner is operated as an oxygen/steam burner; and wherein additional $Co_2$ is supplied in a soot-preventing amount for an $H_2/CO$ ratio of about 3 in the synthesis gas.

* * * * *